US006859912B2

(12) United States Patent
Brachmann et al.

(10) Patent No.: US 6,859,912 B2
(45) Date of Patent: Feb. 22, 2005

(54) METHOD AND CIRCUIT ARRANGEMENT FOR CLOCK RECOVERY

(75) Inventors: Markus Brachmann, Nuremberg (DE); Thomas Eckart, Bavaria (DE); Hans-Joachim Goetz, Nuremberg (DE); Marcus Putzer, Pleystein (DE)

(73) Assignee: Lucent Technologies Inc., Murray Hill, NJ (US)

( * ) Notice: Subject to any disclaimer, the term of this patent is extended or adjusted under 35 U.S.C. 154(b) by 74 days.

(21) Appl. No.: 10/351,918

(22) Filed: Jan. 27, 2003

(65) Prior Publication Data

US 2003/0145287 A1 Jul. 31, 2003

(30) Foreign Application Priority Data

Jan. 28, 2002 (EP) .............................................. 02250570

(51) Int. Cl.[7] .............................................. G06F 17/50
(52) U.S. Cl. ..................... 716/1; 716/5; 716/6; 327/31; 327/33; 327/35; 327/141
(58) Field of Search ...................... 716/1, 5–6; 327/31, 327/33, 35, 141; 375/354, 355, 362, 364

(56) References Cited

U.S. PATENT DOCUMENTS

| 6,078,200 A | 6/2000 | Miyano ....................... 327/142 |
| 6,266,799 B1 | 7/2001 | Lee et al. ....................... 716/6 |
| 6,650,146 B2 * | 11/2003 | Liu et al. ....................... 327/43 |
| 6,657,466 B1 * | 12/2003 | Sudjian ....................... 327/158 |
| 2003/0142770 A1 * | 7/2003 | Engl et al. ................... 375/355 |

FOREIGN PATENT DOCUMENTS

EP    0 822 683 A2    11/2000    .......... H04L/7/033

* cited by examiner

Primary Examiner—Vuthe Siek

(57) ABSTRACT

Clock recovery from transmitted data signals is carried out entirely digitally, and in a manner that is essentially insensitive to dynamic changes in the phase of the data signal. To this end, at least four phase-shifted sample signals are produced from a predetermined time signal. At least two of these phase-shifted sample signals are selected as a function of the respective phase angles with respect to the data signal, and in each case are supplied separately to a device for time sampling of the data signal with the selected sample signal. One of the devices in each case is connected to an output device for the data signal as a function of the respective phase separations between the data signal and the selected phase-shifted sample signals.

11 Claims, 6 Drawing Sheets

METHOD AND CIRCUIT ARRANGEMENT FOR CLOCK RECOVERY

CROSS REFERENCE TO RELATED APPLICATION

This application claims priority of European Application No. 02250570.5, filed Jan. 28, 2002.

FIELD OF THE INVENTOR

The invention relates to a method for clock recovery for data transmission in digital synchronous systems, and to an appropriately adapted clock recovery circuit.

BACKGROUND OF THE INVENTION

When data is transmitted from one assembly to another assembly, the phase angle of the transmitted data signal is unknown unless the clock is also transmitted. A clock recovery circuit is thus used in the input of the receiver assembly. If only data is transmitted and must then be processed further at the receiver end, it is necessary to find a code inherent in the data. This is done by using a clock recovery circuit to obtain this time clock for the transmitted data from the data.

If the transmitting and receiving assemblies are controlled by a central clock in a larger unit, then, for further processing of the data, the data must once again be matched to the central clock. The phase angle of the data in the receiver must therefore also be determined with respect to the central clock.

This can be done using a traditional phase locked loop (PLL) circuit. In this case, the phases of the data signal and the recovered clock are compared, and the phase angle of the transmitted data signal with respect to the system clock is determined in a feedback arrangement using an analogue phase filter and a voltage controlled oscillator (VCO). One problem that arises in the process when using digital systems is that a conventional phase locked loop contains analogue components, which cannot be directly connected to the digital units in a complete digital system.

However, a system clock is frequently also passed from a central time unit in the system to various data processing units. Each of the data processing units contains its own phase locked synchronization (PLL), in order to obtain a clock signal for that unit from the system clock. In a case such as this, all the clocks in the units are synchronized to the system clock. All these data processing units can thus interchange synchronous data with one another, with the data being received by different units. Data is accordingly transmitted between different synchronous clock areas. The receiving unit must match the phase of the received data to its clock in order to be able to further process the data. If the asymmetry of the time clock in the data processing unit, the time delay in the data transmission process and the typical set-up and hold times in the receiving unit are less than one clock period, then the data can also be transmitted without the associated time clock. The receiving unit can match the data to the applicable clock at any time without any disturbance to the set-up and hold conditions.

However, if these conditions cannot be satisfied in a data transmission system, that is to say the data transfer is not completed within one clock period, the data must be transmitted with the associated time clock. An elastic memory is generally used for such transmission, in order to guarantee correct time matching to the local receiving clock.

However, a clock recovery circuit is frequently used in the receiving unit, in order to avoid transmission of the time clock signal associated with the data signal.

One object of the present invention is to carry out the clock recovery process purely digitally, and at the same time to ensure that the recovery process is essentially insensitive to dynamic phase changes in the data signal.

SUMMARY OF THE INVENTION

For clock recovery of a transmitted data signal in synchronous digital systems, the invention provides for at least four phase-shifted sample signals to be produced from a predetermined time signal, at least two of which sample signals are selected as a function of the respective phase angle with respect to the data signal, in order to sample the data signal in parallel in time, and for one of the time-sampled data signals to be passed on to an output device as a function of the respective phase separations between the data signal and the selected sample signals.

To do this, the circuit arrangement according to the invention expediently comprises at least two apparatuses, each having a device for producing a group of two phase-shifted sample signals, a device for selecting a sample signal and a device for time sampling of the data signal, with the apparatuses being connected to one another via a logic selection device such that one device for time sampling can in each case be connected to an output device for the data signal, as a function of the respective phase separations between the data signal and the selected sample signals.

In one expedient development, the device for producing the sample signals comprises a frequency divider whose input signal is the predetermined time signal, obtained in particular from a system clock and by multiplication of its frequency, and its output signals are the phase-shifted sample signals with a period corresponding to the transmission rate of the data signal. The sample signals in one group are in this case advantageously phase-shifted through 180° with respect to one another.

Furthermore, in one development, a device is provided for comparing the phase of the selected sample signal with the data signal, and in consequence emits a numerical value. The production device and the comparison device are expediently connected to one another via a multiplexer such that the respective other sample signal can be tapped off as the selected sample signal at the output of the multiplexer, as a function of a maximum numerical value which can be predetermined, for example using intelligent phase selection logic. Furthermore, it has been found that the logic selection device in each case couples a sampling device into the active time clock matching path as a function of the numerical values.

One embodiment provides for the use of an elastic memory for time sampling, with the predetermined time signal being used for clocking a respective write pointer, and the selected sample signal being used as the associated window signal. Furthermore, the arrangement according to the invention is advantageously designed such that the device for outputting the data signal can be controlled by any desired clock signal that is synchronized to the data signal.

In consequence, the invention results in particular in the advantage that the data signal is sampled at a sampling frequency which is at least four times as fast as the data transmission rate. However, the major advantage in this case is that the time clock frequencies produced or input to the circuit correspond to only twice the data transmission rate. Furthermore, the clock recovery circuit and the associated method according to the invention ensure that a time sampling frequency always has an adequate phase separation from the data signal, with the recovery process in one preferred embodiment being able to operate smoothly and reliably even when the phase of the data signal is subject to dynamic changes of more than 180°.

DETAILED DESCRIPTION

Figure 1:
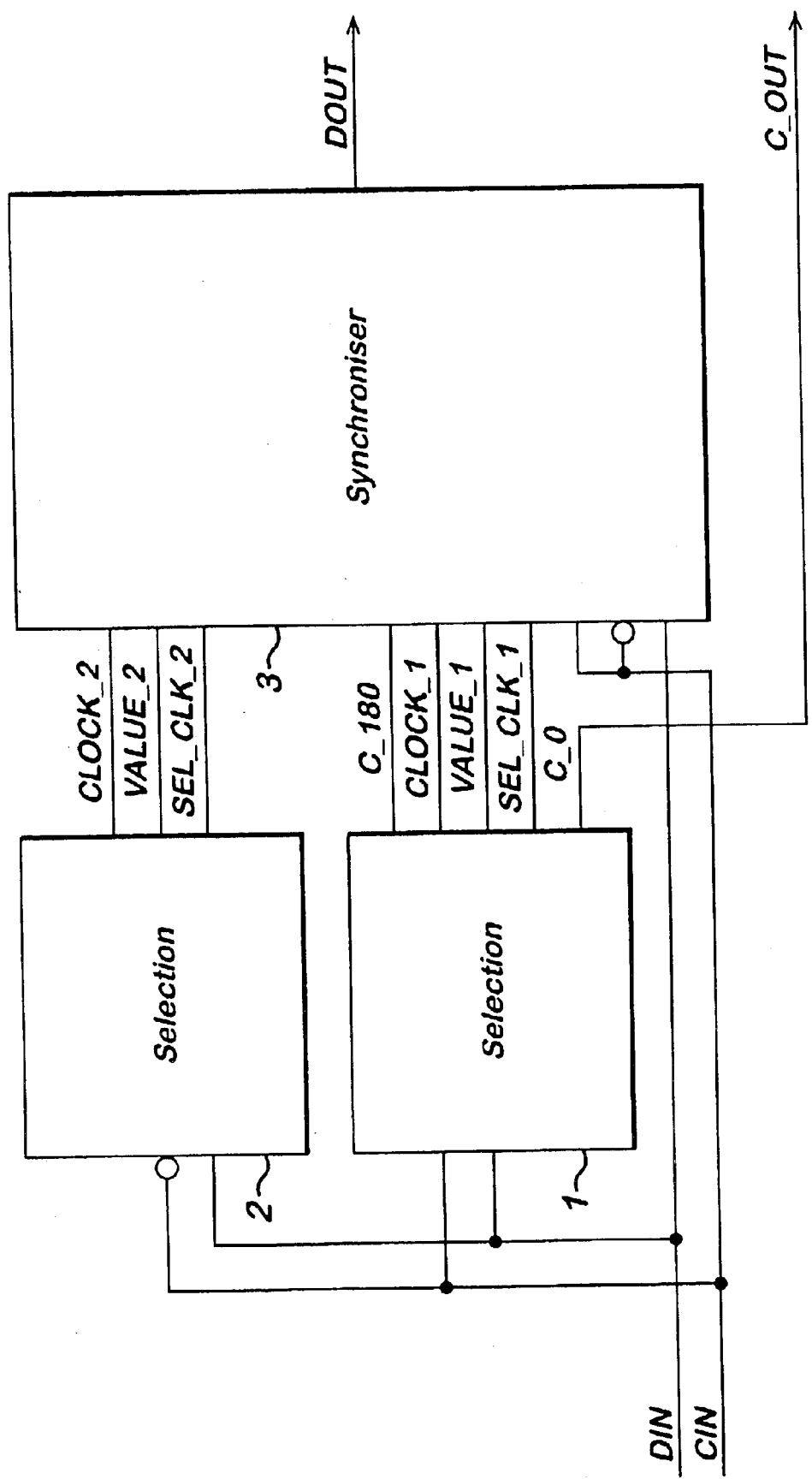
FIG. 1 shows a block diagram of an exemplary embodiment of the clock recovery circuit according to the invention.

The following text refers first of all to FIG. 1 which shows, in simplified form, an exemplary embodiment of a clock recovery circuit according to the invention.

The clock recovery circuit contains two selection apparatuses 1 and 2 and a downstream synchronization apparatus 3. A data signal DIN and input clock frequencies which are at twice the system clock rate are supplied as input signals to the clock recovery circuit. In detail, the data signal DIN and the input clock frequency CIN are supplied to the selection apparatus 1, the data signal DIN and the frequency inverted with respect to the input clock frequency CIN and which is referred to in the following text as CINN (not CIN) are supplied to the selection apparatus 2, and the data signal DIN as well as both clock frequencies CIN and CINN are supplied to the synchronization apparatus 3. The clock recovery circuit according to the invention emits a time-synchronized data signal DOUT at the output of the synchronization apparatus 3. In addition, a time signal C_OUT at half the clock rate of the input signal CIN can be tapped off at the output of the clock recovery circuit.

Figure 2:
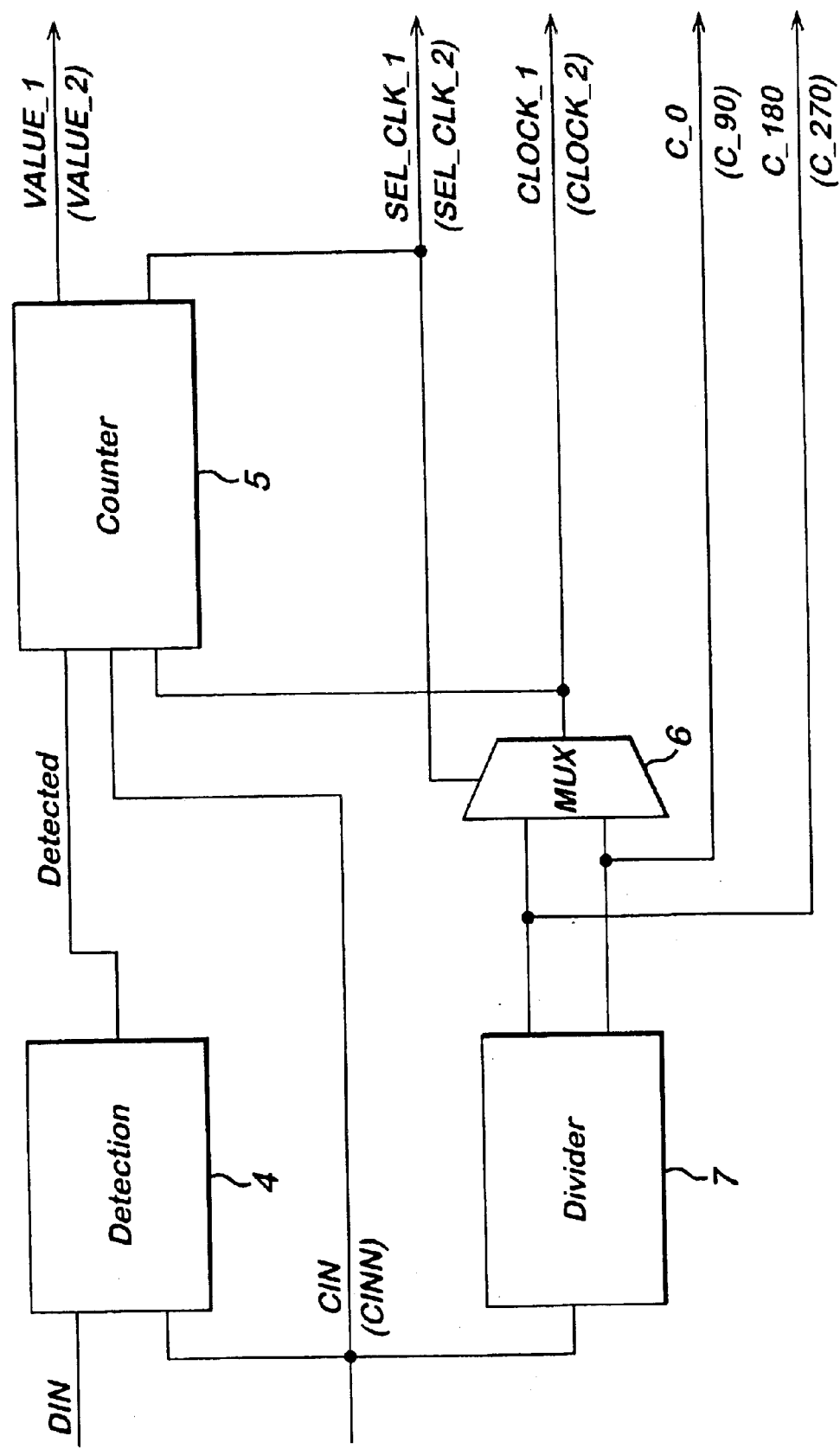
FIG. 2 shows a block diagram of a circuit element of the circuit shown in FIG. 1 for producing sample signals.

FIG. 2 illustrates in more detail one preferred configuration of a selection apparatus 1 or 2, in which case the signals shown in brackets can be associated exclusively with the selection apparatus 2. The selection apparatuses 1 and 2 are essentially of identical design and each comprise a detection device 4, a counting device 5 and a frequency divider 7 which is connected to the counting device 5 via a multiplexer 6.

Figure 3:
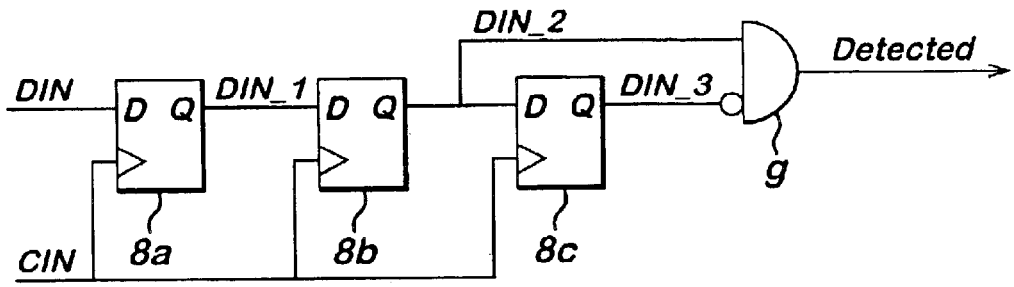
FIG. 3 shows a block diagram of a detection device within the circuit element shown in FIG. 2.

Each detection device 4 expediently has a configuration illustrated by way of example in FIG. 3. According to this embodiment, the detection device 4 contains a shift register which is based on three multivibrator circuits (flipflops) 8a, 8b, 8c, and an AND gate 9. The input signals for the detection device 4 are the data signal DIN and, in the illustrated case of the detection device formed by the selection apparatus 1, the input clock frequency CIN. An output value "DETECTED" is emitted at the output of the AND gate 9 to the counting device 5, for further use. The detection device 4 is designed to register rising signal flanks. However, it should be mentioned that the registration of a falling flank or else of a rising and a falling flank can also be selected for the invention. Furthermore, equivalent circuits can be used for a detection device.

As already mentioned, the data signal DIN and the time signal CIN or CINN, respectively, are supplied as input signals to the selection apparatus 1 or 2. Then, taking account of the output value "DETECTED" coming from the counting device 5, the output signals from the selection apparatuses 1 or 2 are then a numerical value VALUE_1 or VALUE_2, respectively, and a control signal SEL_CLK_1 or SEL_CLK_2, respectively, as well as a time clock CLOCK_1 or CLOCK_2, respectively, selected via the multiplexer 6. Furthermore, two clock signals C_0 and C_180 or C_90 and C_270 are produced via the frequency divider.

Figure 4:
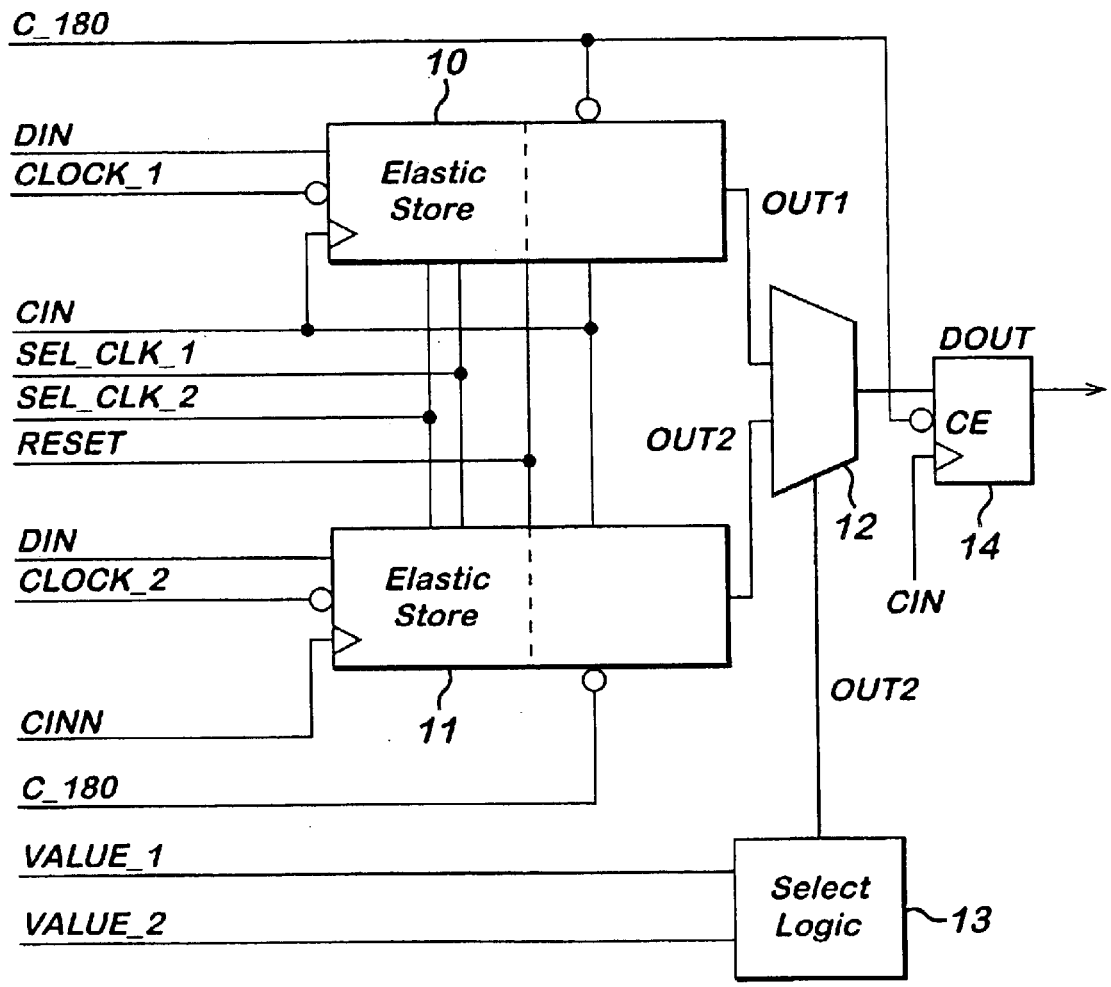
FIG. 4 shows a block diagram of a further circuit element of the circuit shown in FIG. 1 for data signal synchronization with a selected sample signal.

The synchronization apparatus 3 illustrated by way of example in FIG. 1 is shown in more detail in FIG. 4. According to FIG. 1 and FIG. 4, the synchronization apparatus 3 receives not only the data signal DIN but also the clock frequencies CIN and CINN, in particular the control signals SEL_CLK_1 and SEL_CLK_2, the numerical values VALUE_1 and VALUE_2 and the time clocks CLOCK_1 and CLOCK_2.

According to FIG. 4, two memory devices 10 and 11 are essentially provided for processing the supplied signals and, in this embodiment, are in the form of elastic memories. The outputs from the elastic memories 10, 11 are connected to a multiplexer 12, which can be controlled via selection logic 13. The output of the multiplexer 12 is connected to a multivibrator circuit 14 (flipflop), from which the time-synchronized data signal DOUT is emitted. In one embodiment of the invention, the elastic memories 10, 11 each contain phase indication logic, which will be described later, on the input side.

The method of operation of the clock recovery circuit according to the invention and of the method according to the invention for clock recovery will be explained in the following text with reference to the accompanying figures.

Figure 5:
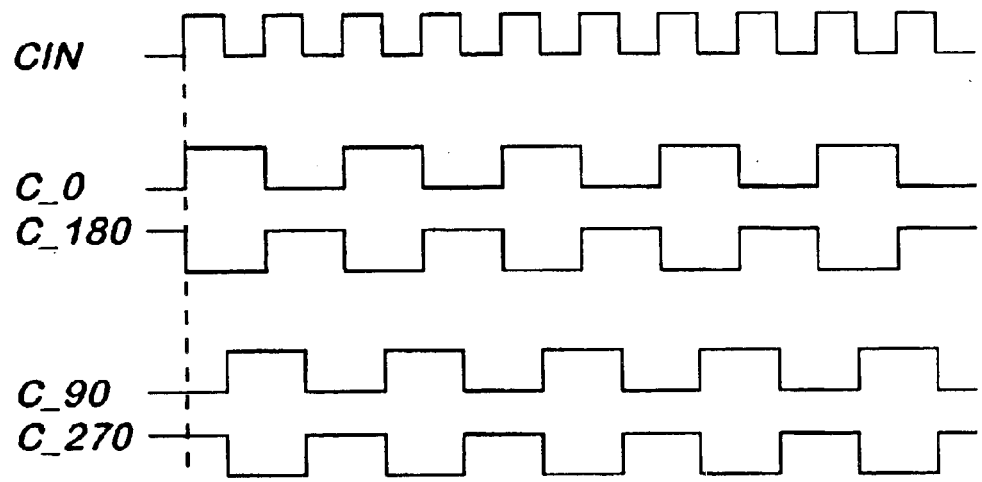
FIG. 5 shows various time signals used for data signal synchronization.

FIG. 5 shows time signals used for the clock recovery circuit according to the invention as shown in FIGS. 1 to 4. As already mentioned above and based on the input clock frequency CIN, the frequency divider 7 produces clock signals C_0 and C_180 or C_90 and C_270. In detail, the frequency divider 7 uses the input clock frequency CIN to produce the signals C_0 and C_180 and, with the inversion of the input clock frequency CIN, the signals C_90 and C_270 from the inverted frequency CINN. These four signals, which are produced from the input clock frequency CIN, are at half the clock rate of the input clock frequency CIN, and thus correspond to the data transmission rate of the input data DIN.

Thus, according to the invention, and as shown in FIG. 5, two groups each having two phase-shifted sample signals are available, in which case the one group, that is to say C_0 and C_180, can be associated with the input clock frequency CIN, and the two other sample signals C_90 and C-270 can be associated with the inverted input clock frequency CINN. In consequence, the sample signals within each group are separated from one another by 180°. According to the invention, one of these four sample signals is selected for time control of the input data. To do this, as shown in FIG. 2, a sample signal is selected in accordance with the following description from a group CLOCK 1 or CLOCK_2 of sample signals, that is to say from C_0 and C_180 or C_90 and C_270, by means of the multiplexer 6 connected downstream from the frequency divider 7, and as a function of the control signal SEL_CLK_1 or SEL_CLK_2, respectively, received from the counting device 5, and this sample signal is passed on to the synchronization apparatus 3. As can be seen from FIG. 4, this sample signal is this case passed on by feeding a write pointer to one of the elastic memories 10 or 11 using this sample signal.

Figure 6:
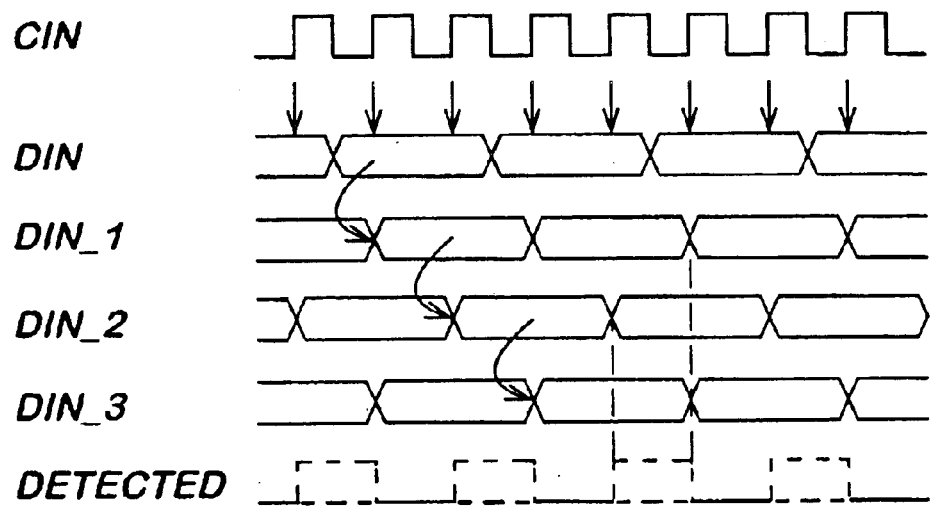
FIG. 6 shows a schematic illustration of the production of a detection pulse for the detection device shown in FIG. 3.

Since the control signals SEL_CLK_1 or SEL_CLK_2 are dependent on the "DETECTED" signal, the method of operation of the detection device 4 and the formation of the "DETECTED" pulse, together with its time relationship to the data input signal DIN and the input clock frequency CIN will be described first of all, with reference to FIG. 6 in conjunction with FIG. 3.

The signals which are input to the shift register, which is formed from three flipflops 8a, 8b and 8c, that is to say the data signal DIN and the signal CIN, are used to produce a "DETECTED" pulse as a function of the presence of a positive signal flank of the data signal DIN. In detail, the first flipflop 8a in the shift register is initially used to suppress metastable signal components. The output signal DIN_1 from the first flipflop 8a and the input clock frequency CIN represent the input signals to the second flipflop 8b. The output signal DIN_2 from the second flipflop 8b and the output signal DIN_3 from the third flipflop 8c, to whose input side the data signal DIN_2 and the input clock frequency CIN are applied, are passed to the logic AND gate 9. The "DETECTED" pulse is thus produced at the output of the gate 9 provided the data input signal DIN has a rising signal flank.

The "DETECTED" pulse is passed to the input of the counting device 5, as shown in FIG. 2. The counting device 5 has an UP-DOWN counter, which is referred to in the following text as the COUNTER and detects error events. According to the invention, an error occurs when an active flank of a sample signal selected via the multiplexer 6, referred to in general form in the following text as C_n, falls in a time interval field in which a change in the data signal occurs. In order to detect such an error, a signal $\overline{C\_n}$, which is inverted with respect to the selected sample signal, is used as a window signal for the "DETECTED" pulse. Provided a "DETECTED" pulse occurs in the high interval of the sample signal C_n, no fault is present. Since a shift register is used in the detection device 4, the "DETECTED" pulse is delayed by one clock period relative to a flank in the input data signal.

Figure 7:
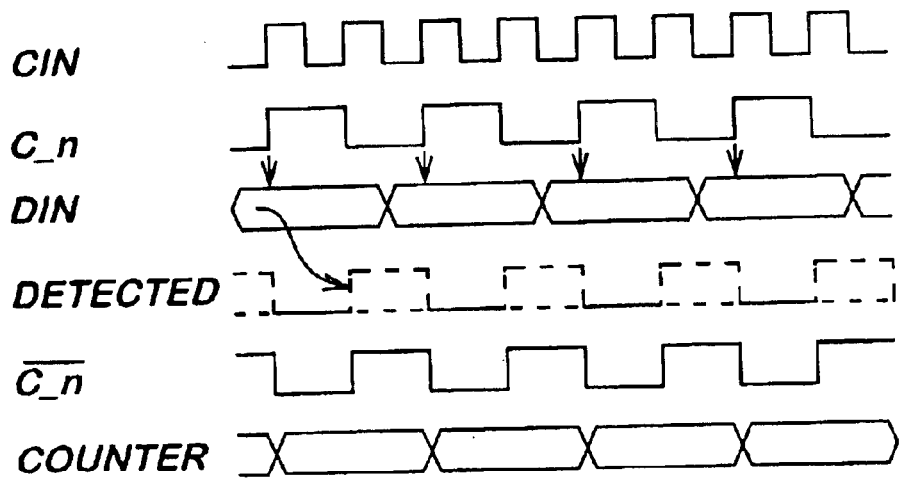
FIG. 7 shows a signal diagram relating to the identification of a false selected sample signal.

The time signals involved in the detection of an error are shown in FIG. 7. According to FIG. 7, the high intervals of the inverted sample signals $\overline{C\_n}$ which are used as a window signal and the signal of the "DETECTED" pulse coincide, so that an error message is detected in the counting device 5. The COUNTER is clocked with the input clock frequency CIN (FIG. 2), and is thus clocked at a frequency which is twice as fast as the data signal DIN. Only rising signal flanks are detected, so that the state of the COUNTER is increased by four when an error is present while, in contrast, the state of the counter is reduced by one during signal operation without any errors.

When the COUNTER reaches its maximum count, then the polarity of the control signal SEL_CLK_1 or SEL_CLK_2 changes in order thus, via the multiplexer 6, to select a different sample signal, preferably the signal inverted with respect to the previous sample signal. In consequence, provided C_0 has previously been selected as the sample signal, then the signal C_180 whose phase angle is shifted through 180° is then selected. The window signal, which is required for detection of errors, is also changed in a corresponding manner. The COUNTER accordingly counts down to the count 0, remaining at zero until the next error is found.

The principle of the counting process is shown in the form of a graph in FIG. 8, and will be described in the following text, on the basis of signals required for this purpose. In this case, the maximum count is set, by way of example to "seven". The selected sample signal C_n is C_0. Initially, the selected sample signal C_0 is incorrect, so that the "DETECTED" pulse is delayed by one data bit with respect to the rising flank of the data signal DIN, see the arrow (1) in FIG. 8. On the arbitrary assumption that the count of the COUNTER is "two" during this, the count will now rise to "six" as shown by the arrow (2) when the first error is detected.

Figure 8:
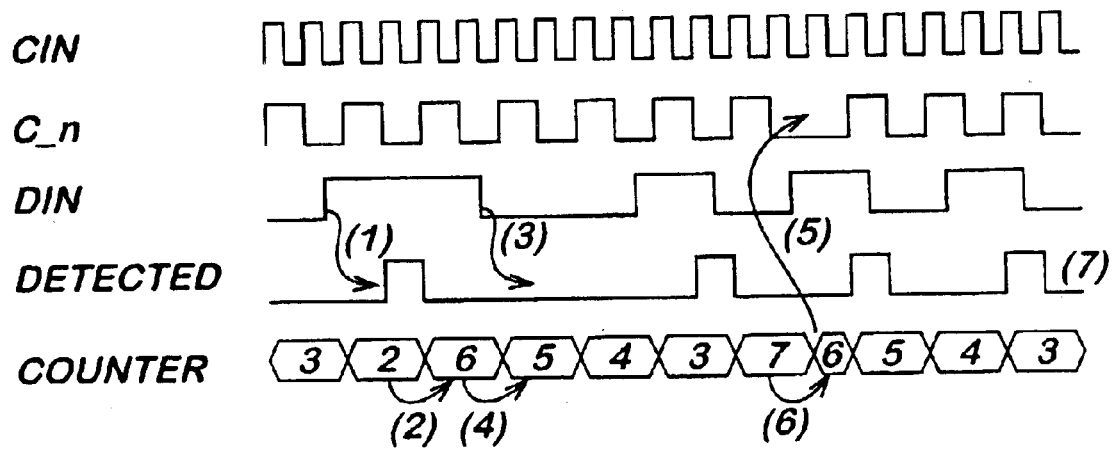
FIG. 8 shows a schematic illustration of the decision process for identification as shown in FIG. 7.

Furthermore, as shown in FIG. 8, the value of the COUNTER is now reduced in steps from "six" to "three" with each cycle of the window signal (arrow (4)), providing only falling signal flanks (arrow (3)) or no changes in the data signal DIN are observed. In conjunction with the formation of the "DETECTED" pulse as shown in FIG. 3, the next error occurs at a count "three", as a result of which the count is increased to "seven" (arrow (6)). Since "seven" has been assumed, by way of example, to be the maximum counter value, the selected signal is in consequence changed to a signal which is phase-shifted through 180°, that is to say, in the present example, to the signal C_180. Since the newly selected window signal is preferably the signal inverted with respect to the old window signal, the high interval of the window signal is doubled for one time cycle (arrow (6)). The next "DETECTED" pulse now falls in the low interval of the new window signal C_180, as a result of which the COUNTER is reduced by "one", provided no data errors occur.

The counting device 5 emits the count value (described above) of the COUNTER as the variable VALUE to the selection logic 13 which is provided, as shown in FIG. 4, for controlling the multiplexer 12. Depending on the respectively obtained value VALUE_1 or VALUE_2, the selection logic 13 switches the multiplexer 12 such that it in each case emits as the signal DOUT the data signal OUT1 or OUT2, respectively, sampled by means of a selected sample signal using the best phase separation, as described below, via the output multivibrator circuit 14.

As already mentioned, the synchronization apparatus 3 is supplied, as shown in FIGS. 1 and 4, essentially with the data input signal DIN, the input clock frequency CIN as well as the inverted input clock frequency CINN, the control signals SEL_CLK_1 and SEL_CLK_2 and the selected time signals CLOCK_1 and CLOCK_2. The synchronization apparatus 3 provided in the clock recovery circuit according to the present exemplary embodiment now selects a time signal for the time control of the data signal DIN, in particular using the memory devices 10 and 11, from the two time signals CLOCK_1 and CLOCK_2 proposed respectively by the selection apparatuses 1 and 2. Furthermore, the circuit arrangement is used for adjusting the timing of the input data signal DIN with respect to a time signal in a phase which is always constant and defined.

The elastic memories 10 and 11, which are illustrated with their input and output signals in FIG. 4, are designed to be internally essentially identical according to the invention, with the data input signal DIN being passed to both of them in parallel. The write pointer of the elastic memory 10 is clocked at the input clock frequency CIN, and the selected sample signal from the signal group CLOCK__1 is used as the window signal in order to allow the write pointer to be incremented in every alternate clock period of the input clock CIN. The write pointer of the elastic memory 11 is clocked at the inverted input clock frequency CINN, and a sample signal from the sample signal group CLOCK__2 is used in a corresponding manner as the window signal for the incrementation process for the write pointer. Furthermore, both elastic memories 10 and 11 use the input clock frequency CIN for the time control of the read pointer. In this case, the read pointer for the two elastic memories is controlled as a window signal by means of one of the sample signals in every alternate period of the input clock frequency CIN. The sample signal C__180 is preferably used for this purpose for the two elastic memories. Since the clocks which are used for controlling the write and read pointers are synchronized to one another, there is no need to dynamically monitor the offset between the write pointer and the read pointer.

The multiplexer 12, which receives the output signals OUT1 and OUT2 from the elastic memories 10 and 11, respectively, on the input side, passes one of them on, as shown in FIG. 4, to the output multivibrator circuit 14, which is triggered by the input clock frequency CIN. The output multivibrator circuit 14 furthermore receives, as the window signal for time monitoring, and preferably in a uniform manner, the sampling frequency C__180, which is also passed to the read pointer for the elastic memories 10 and 11. Since the output signal DOUT from the circuit arrangement according to the invention can be controlled in time by each time signal that is synchronized to it, for further processing in other components or, for example, on the same printed circuit board, this may expediently be done, for example, via the signal C__0, which corresponds to the output signal C__OUT shown in FIG. 1.

Figure 9:
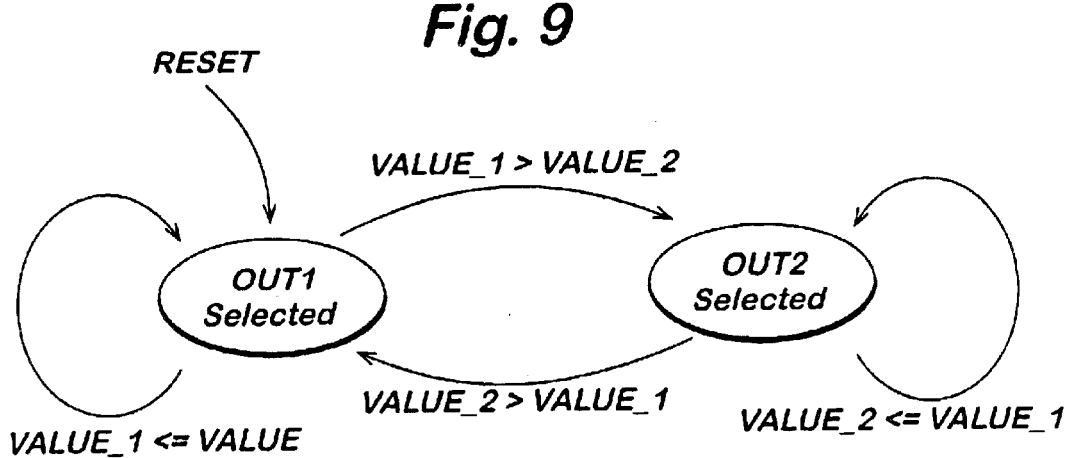
FIG. 9 shows a schematic illustration of selection logic that is used within the circuit element shown in FIG. 4.

The multiplexer 12 itself is controlled by the selection logic 13 via the correspondingly received error signals VALUE__1 or VALUE__2, as indicated above. The control mechanism, which is carried out for this purpose by the selection logic 13, for the multiplexer 12 is illustrated schematically in FIG. 9. In the present exemplary embodiment, the control mechanism guarantees that a sample signal is always selected whose phase separation from the data signal is at least 90°. The method of operation required to do this will be described in detail in the following text with reference to FIG. 9, based on the following assumptions by way of example.

The sample signal C__0 is responsible for the write pointer of the elastic memory 10, and the sample signal at the same clock rate C__90, which is phase-shifted through 90° with respect to it, is responsible for the write pointer of the elastic memory 11. The two input variables VALUE__1 and VALUE__2 for the selection logic 13 are zero, which indicates that both time clocks are suitable for time control. Furthermore, the elastic memory 10 is selected as the time control path by the selection logic 13, and the phase of the data signal varies in the positive direction.

Based on this, the value VALUE__1 will indicate errors in the time controlled by the sample signal C__0, as a result of which the value VALUE__1 becomes greater than the value VALUE__2. The multiplexer 12 now selects the elastic memory 11 as the applicable path for time control of the data.

No errors occur while switching from the elastic memory 10 to the elastic memory 11 since the write pointer in the elastic memory 11 is controlled by a correct time signal (C__90). Provided the value VALUE__1 rises to its maximum value, the time monitoring signal in the elastic memory 10 is changed from C__0 to C__180 as the controlling signal for the write pointer. However, this means that the elastic memory 10 is now monitored by a suitable time control signal.

The pointer offset can be set via a "reset" signal to half the buffer size of a memory, in which case the memory size can expediently be designed to be variable, and/or taking account of the characteristics of the data input signal DIN.

If dynamic phase changes of more than 180 occur, the present invention provides for different selection logic to be used within the elastic memories 10 and 11. The input signals for such selection logic are the variables SEL__CLK__1 and SEL__CLK__2. In the case of phase changes such as these, the write pointer for the elastic memory must know when the phase of the data signal passes through the 360° limit since, in a case such as this the write pointer must be advanced by "one", or must be reset, if the change in the mathematical sign of the phase is negative. This selection logic, which takes care of such dynamic changes, is expediently the only logic device in the present invention which transmits data from one clock network CIN to another clock network CINN, directly and without the assistance of any elastic memory. No problems occur in the process, since the output signals are processed in elastic memories. The direction of any dynamic phase shift is always known during the processing of the signals SEL__CLK__1 and SEL__CLK__2.

Figure 10:
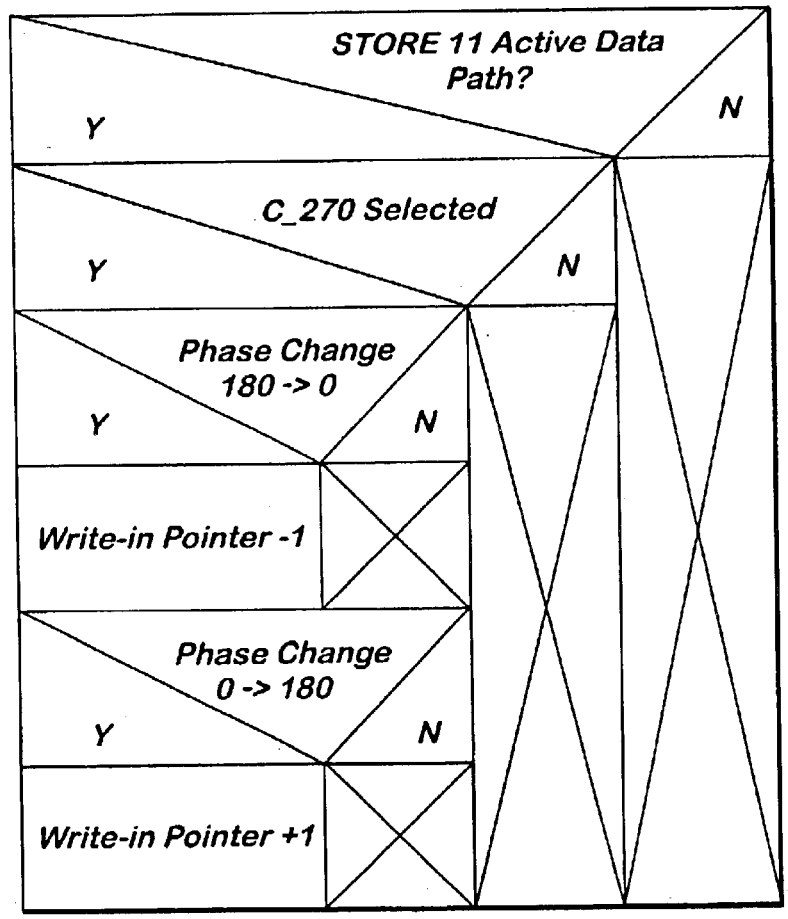
FIG. 10 shows a schematic illustration of phase processing.

FIG. 10 shows a structured diagram of such phase processing, with the assumption being made that the elastic memory 11 is the active data path. Since the phase processing can be carried out only in a non-active elastic memory, the change and, before it, the check, are in this case directed at the elastic memory 10. In this case, as shown in FIG. 10, any change in the write pointer of the non-active elastic memory is dependent on the selected sample signal and on the direction of the selected phase change.

It should be mentioned that the invention is not restricted to the described exemplary embodiment with the two selection apparatuses 1 and 2 which are intended for sample signal production and selection, respectively, and respectively associated devices for matched data signal sampling, but can be modified in a large number of ways.

In consequence, the method according to the invention can also be carried out using circuit arrangements which have more than two basic units, which interact via mutually associated devices for sample signal production and processing.

Furthermore, the use of the inverted input clock frequency CINN for time control of the selection apparatus 2 (FIG. 1) and of the write pointer for the second memory 11 is a preferred and, furthermore the simplest choice, for a second time system. However, according to the invention, any other time signal which is at the same frequency as the input clock frequency CIN and has a defined phase offset from it can also be used for this purpose. It is also within the scope of the invention to use additional time systems which are synchronized to the input clock frequency CIN. In this case, the use of each further time system is highly advantageous in order to improve the sensitivity in the detection of a change in the data signal, and hence to improve the error detection probability further.

In particular, the scope of the present invention provides for n basic units, where $n \geq 2$, each having a selection apparatus k and an elastic memory k, where k=1, 2 . . . n, to be controlled by an input clock frequency signal which is obtained by a simple delay from the input clock frequency CIN. In order to ensure that the phase separation between the clock signal CIN_k and the clock CIN_k+1 is the same, all the clocks CIN_k are produced by the same device, by delaying the input clock frequency CIN. According to the invention, in this case, the phase offset of the clock with the maximum delay CIN_nmax is approximately equal to (360×(1−1/nmax) degrees. If all these time clocks are selected such that they are synchronized to one another, and if the respective transitions between these different clock signals are ensured by the clock systems each having an elastic memory, clock disturbances during digital data processing are essentially completely precluded. Furthermore, the maximum clock frequency used for time control is twice as fast as the data transmission rate, with the data in the already described case being sampled at a frequency of 2*nmax.

It is also within the scope of the invention for different input clock frequencies CIN_m to be produced by one system clock unit, which operates at m-times the frequency of the input clock frequency CIN. The factor m should in this case expediently be chosen to be even, which means that the time signals have equidistant phase separations within one cycle of the input clock frequency CIN.

It is self-evident that the counting device 5, whose function has been described with reference to FIG. 8, can also be designed differently within the scope of the invention. In particular, the stated maximum numerical value may essentially have any desired value and, in contrast to what has been described above, may be greater than or less than seven.

The active flank of the clock frequencies CIN and CINN may also, for example, be the falling flank. A corresponding situation applies to the relative time association between the sample signals and the data signal, and this can also relate to the falling flank instead of the rising data flank. Within the scope of the present invention, the size of the elastic memory may be chosen as required.

Finally and obviously, is it self-evident that the individual features of the invention may also be used in combinations other than those illustrated and described.

What is claimed is:

1. A method for clock recovery from a transmitted data signal in synchronous digital systems, comprising the following steps:
   producing at least four phase-shifted sample signals from a predetermined time signal,
   selecting at least two of the sample signals as a function of a respective phase angle with respect to the transmitted data signal phase,
   sampling the transmitted data signal with each selected sample signal in parallel over time, and
   passing on to an output device one of the time-sampled data signals as a function of respective phase separations between the data signal and the selected sample signals.

2. The method according to claim 1, wherein the at least four phase-shifted sample signals are each produced with a period corresponding to the transmission rate of the data signal.

3. The method according to claim 1, wherein the at least four phase-shifted sample signals are produced in groups of two sample signals each, with one being selected from each group.

4. The method according to claim 3, wherein a phase separation of 180° is produced between the phase-shifted sample signals within a group.

5. The method according to claim 3, wherein a respectively associated numerical value is set in response to a phase comparison between each selected sample signal and the data signal, and, on reaching a predetermined maximum numerical value, the respective other phase-shifted sample signal is selected from the corresponding group of phase-shifted sample signals.

6. The method according to claim 1, wherein a respectively associated numerical value is set in response to a phase comparison between each selected sample signal and the data signal, and one of the sampled data signals is in each case passed on to the output device as a function of the numerical values.

7. The method according to claim 1, characterized in that a clock signal which is synchronized to the predetermined time signal is used for clocking the output device.

8. A circuit arrangement for clock recovery from a transmitted data signal comprising carrying at least two apparatuses, each apparatus comprising:
   a device for producing a group of two phase-shifted sample signals from a time signal which is predetermined for the circuit arrangement,
   a device for selecting a sample signal from the group of phase-shifted sample signals as a function of a respective phase angle with respect to the transmitted data signal phase,
   a device for sampling of the data signal in time with the selected sample signal,
   wherein the apparatuses are connected to one another via a logic selection device such that one of the devices for sampling is in each case connected to an output device for the data signal as a function of the respective phase separations between the data signal and the selected sample signals.

9. The circuit arrangement according to claim 8, wherein a signal which is obtained from a system clock by multiplying its frequency, and/or a signal which is inverted with respect to this signal can be preset as the time signal.

10. The circuit arrangement according to claim 8, wherein the device for time sampling comprises a memory bank, with a write pointer and a read pointer, with the predetermined time signal being used for clocking the write pointer and/or the read pointer, and the selected sample signal being used as a window signal.

11. The circuit arrangement according to claim 10 wherein the memory bank is an elastic memory.

* * * * *